US011470365B2

(12) United States Patent
Schulz

(10) Patent No.: US 11,470,365 B2
(45) Date of Patent: Oct. 11, 2022

(54) VIDEO READER WITH MUSIC WORD LEARNING FEATURE

(71) Applicant: Melanie Schulz, Lockport, NY (US)

(72) Inventor: Melanie Schulz, Lockport, NY (US)

( * ) Notice: Subject to any disclaimer, the term of this patent is extended or adjusted under 35 U.S.C. 154(b) by 921 days.

(21) Appl. No.: 16/240,289

(22) Filed: Jan. 4, 2019

(65) Prior Publication Data
US 2019/0141372 A1 May 9, 2019

Related U.S. Application Data

(63) Continuation-in-part of application No. 15/530,093, filed on Dec. 1, 2016, now abandoned.
(Continued)

(51) Int. Cl.
*G06F 17/00* (2019.01)
*H04N 21/2343* (2011.01)
(Continued)

(52) U.S. Cl.
CPC ..... *H04N 21/234336* (2013.01); *G06F 3/013* (2013.01); *G06F 3/165* (2013.01); *G06F 40/103* (2020.01); *G11B 27/10* (2013.01); *H04N 21/235* (2013.01); *H04N 21/4312* (2013.01); *H04N 21/44218* (2013.01); *H04N 21/4888* (2013.01); *H04N 21/8106* (2013.01); *H04N 21/816* (2013.01); *H04N 21/854* (2013.01)

(58) Field of Classification Search
CPC ......... H04N 21/234336; H04N 21/235; H04N 21/4312; H04N 21/44218; H04N 21/4888; H04N 21/8106; H04N 21/816; H04N 21/854; G06F 3/013; G06F 3/165; G06F 40/103; G11B 27/10
See application file for complete search history.

(56) References Cited

U.S. PATENT DOCUMENTS 5,777,614 A 7/1998 Ando
8,822,801 B2 * 9/2014 Spata .................. G09B 15/003
84/478

(Continued)

OTHER PUBLICATIONS

Robin, Bernard. "The educational uses of digital storytelling." Society for Information Technology & Teacher Education International Conference. Association for the Advancement of Computing in Education (AACE), 2006 (Year: 2006).*
Shodiqin, Imam, Rahayu Apriliaswati, and Eusabinus Bunau. "Improving Students' Pronunciation by Listening to the Audio Visual and Its Transcription of the Narrative Text." Jurnal Pendidikan dan Pembelajaran Khatulistiwa 4.3 (2015) (Year: 2015).*

*Primary Examiner* — Andrew T McIntosh
(74) *Attorney, Agent, or Firm* — Vincent G. LoTempio

(57) ABSTRACT

Reading material on video gives the reader a seamless reading experience by displaying on a device of their choice a series of segments containing letters, words, phrases, sentences and/or paragraphs on a background of the drafter's choice. One segment flows into the other until the reading material is completed. These sequential segments are set to be viewed seamlessly with audio accompaniment. Words, sentences or paragraphs are set to music, where recognizable features of the music are played at the appearance of a certain word or the beginning of a sentence or paragraph. The appearance of a word, sentence or paragraph may be accompanied by the appearance of an image representing the word, sentence or paragraph, along with a recognizable designated musical element.

17 Claims, 14 Drawing Sheets

Related U.S. Application Data

(60) Provisional application No. 62/388,795, filed on Mar. 17, 2016.

(51) Int. Cl.

| | | |
|---|---|---|
| *H04N 21/488* | (2011.01) | |
| *H04N 21/235* | (2011.01) | |
| *G06F 3/01* | (2006.01) | |
| *G06F 3/16* | (2006.01) | |
| *H04N 21/81* | (2011.01) | |
| *H04N 21/854* | (2011.01) | |
| *G11B 27/10* | (2006.01) | |
| *H04N 21/431* | (2011.01) | |
| *H04N 21/442* | (2011.01) | |
| *G06F 40/103* | (2020.01) | |

(56) References Cited

U.S. PATENT DOCUMENTS

| | | |
|---|---|---|
| 9,411,416 B2 | 8/2016 | Song |
| 9,575,960 B1 * | 2/2017 | Lerner .................. G06F 40/30 |
| 2005/0010952 A1 * | 1/2005 | Gleissner .............. G09B 17/00 |
| | | 725/135 |
| 2009/0199091 A1 * | 8/2009 | Covington ............ G06F 40/103 |
| | | 715/256 |
| 2011/0153047 A1 | 6/2011 | Cameron |
| 2014/0195900 A1 | 7/2014 | Gabel |
| 2015/0254999 A1 * | 9/2015 | Goll ..................... G09B 7/00 |
| | | 434/169 |

* cited by examiner

KEYWORDS FOR THE HOUSE

Our house was the smallest on the street. I do not like it. My mom does not like it either.

200

210

21 ⟶ HOUSE    LITTLEST

FIG. 9

VIDEO READER WITH MUSIC WORD LEARNING FEATURE

CROSS-REFERENCE TO RELATED APPLICATIONS

This application claims the benefit of U.S. application Ser. No. 15/530,093 having a filing date of Dec. 1, 2016. Further, this application claims the benefit of provisional patent application Ser. No. 62/388,795 having a filing date of Mar. 17, 2016.

FIELD

This application claims the benefit of U.S. application Ser. No. 15/530,093 having a filing date of Dec. 1, 2016. Further, this application claims the benefit of provisional patent application Ser. No. 62/388,795 having a filing date of Mar. 17, 2016.

The present invention relates to video reading material, and more specifically to a format of video reading that allows for improved language learning.

BACKGROUND

The statements in this section merely provide background information related to the present disclosure and may not constitute prior art.

A traditional book includes words on paper for reading. Such works use finite resources to create, take up valuable physical space, and disengage the reader each time a page is turned. An early version of a video reader, the e-book, was created by Michael Hart in 1971, followed by many other relevant patents: U.S. Pat. No. 5,761,485 (June 1998, Munyan), U.S. Pat. No. 6,229,502 (May 2001, Schwab), U.S. Pat. No. 4,855,725 (September 2089, Fernandez), EP 0390611 (October 1990, Tsuchiya), W01997020274 (June 1997, Munyan), WO 1987001481 (August 1987, Stein). Each solves the problems of finite resources and space, but does not solve the problem of the disengaged reader who had to step out of the story long enough to manually click/swipe a page turn.

Enhanced books, like e-books, take into consideration finite resources and space and do offer enhancements such as music and video hyperlinks, among others. Examples include U.S. Pat. No. 9,053,640 (June 2015, Hendricks, Asmussen), US 20110261030 (October 2011, Bullock), US 20130209981 (August 2013, Newell), US 20160059146 (March 2016, Javida, Savino, Tydingco, Zarich, Weiss), US 20090235162 (September 2009, Nuccio, Martinez, Tynan-Winters, Nebel), US 20120001923 (January 2012 Weinzimmer, Weinzim-mer), and Adaptive Audio, released from Marvel Comics on Mar. 12, 2014 at SXSW. In some cases these enhancements are automatic, but the progression in the story is not. In each case, the reader must still manually advance the reading material with a click of a button or a swipe of a finger, thus taking the reader further out of the story the author has created. There are many patents/patent applications/articles pertaining to the enhancements of ebooks/books, but no one has addressed the need for a fully engaged reader—one who is not being constantly and consistently pulled out of the world the author has tried to create.

The closest the problem was to being addressed was by the authors of U.S. Pat. No. 7,853,900 B2 (Nguyen, Yawitz), when they stated: "When the user reads the book in electronic form, the user typically must wait for the computer monitor to render the book's pages as the user reads the book. A provider of electronic media items faces various challenges, as many users continue to prefer consuming media items in traditional form. The provider confronts the task of capturing the interest of such users, while providing a solution that is viable from a technical standpoint and a business-related standpoint. For instance, the provider faces the challenge of rendering the book's pages in an efficient manner that does not cause the user to lose interest in the media item." Their solution as described in this patent: animating the curser.

The references listed all fail to give the reader the seamless reading experience this invention offers, and in the case of the traditional book, finite resources and space are also squandered. This invention delivers both: a reading experience on devices readily available, and immersion into reading material without the wait and distraction of a page turn.

SUMMARY

The present disclosure teaches a system and method for providing a continual reading experience on a video screen, and linking the continual reading experience to music in order to improve language learning. Identifiable changes in music playing along with the text can draw attention of a user to a particular word, sentence, paragraph or other portion of text that a designer intends for a user to learn. A background image associated with the word may appear on the video screen along with the change in music, or introduction of music. Identifiable changes in music include, but are not limited to, changes in key, time signature, instrumentation, volume, introduction of a specific chord associated with a word.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 9 shows examples of keywords according to the present disclosure.

DETAILED DESCRIPTION

According to the present disclosure, reading material on video may be created by drafting a series of segments, placing them in order, setting them at reading speed, and exporting the finished product on video feed on a device of their choosing.

Figure 1:
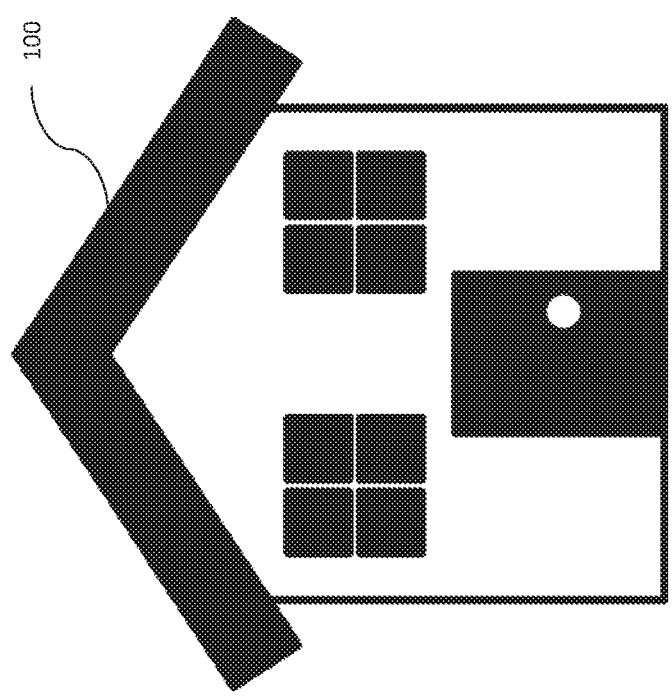
FIG. 1 shows a video screen including a background according to the present disclosure.
Figure 1:

With regard to FIG. 1, in a first step, a background image 10 is selected. This background image 10 may be a visual representation of any kind, such as a blank screen or an artist's masterpiece. If an artist's masterpiece, a picture is taken of the artwork and uploaded onto the software to be further drafted upon. Other background images may be used as well, as many as the imagination may create and are not meant to be limited by the description of this invention.

The background may be related to the story, such that when the background is a house, a segment 24 (shown in FIG. 8) of the story discussing the house will appear as words on the screen.

Figure 2:
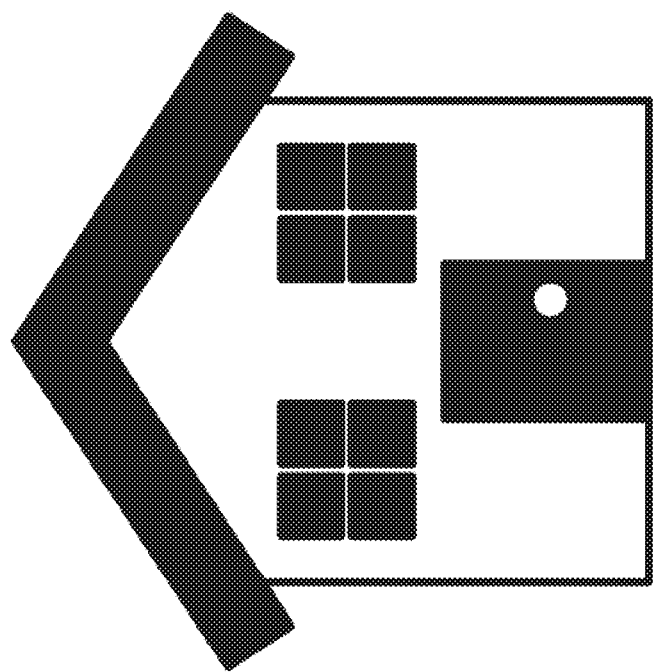
FIG. 2 shows a video screen including a background and a first segment according to the present disclosure.
Figure 2:

With regard to FIG. 2, a first segment 12 of the words of the story are shown upon the background, using commonly available computer software, which may include MICROSOFT PAINT™, letters, words, sentences, and/or paragraphs are placed. This may be accomplished by copying and pasting from existing word processing tools such as MICROSOFT WORD™ documents, although letters, words, sentences, and/or paragraphs may be typed directly onto the background as well. First segment 12 is saved, using, in one embodiment, a flash drive.

Figure 3:
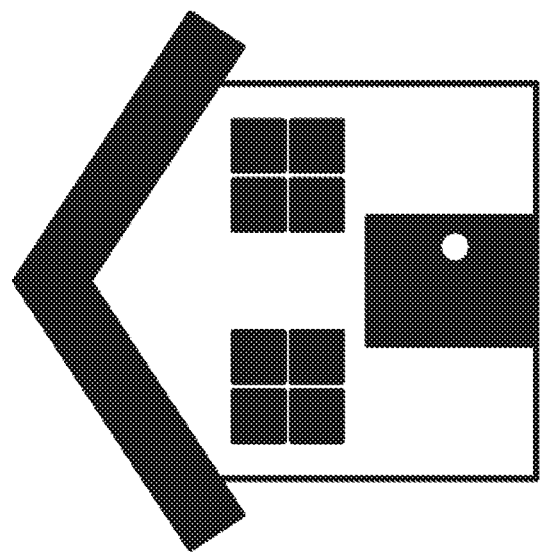
FIG. 3 shows a video screen including a background and a second segment according to the present disclosure.

If needed, a second segment 14 and third segment 16, and additional segments, may be drafted as a continuation of the first segment 12, including and adding to all the letters, words, sentences, and/or paragraphs of the first segment, as shown in FIG. 3. The second segment 14 is saved, again, on a flash drive.

Figure 4:
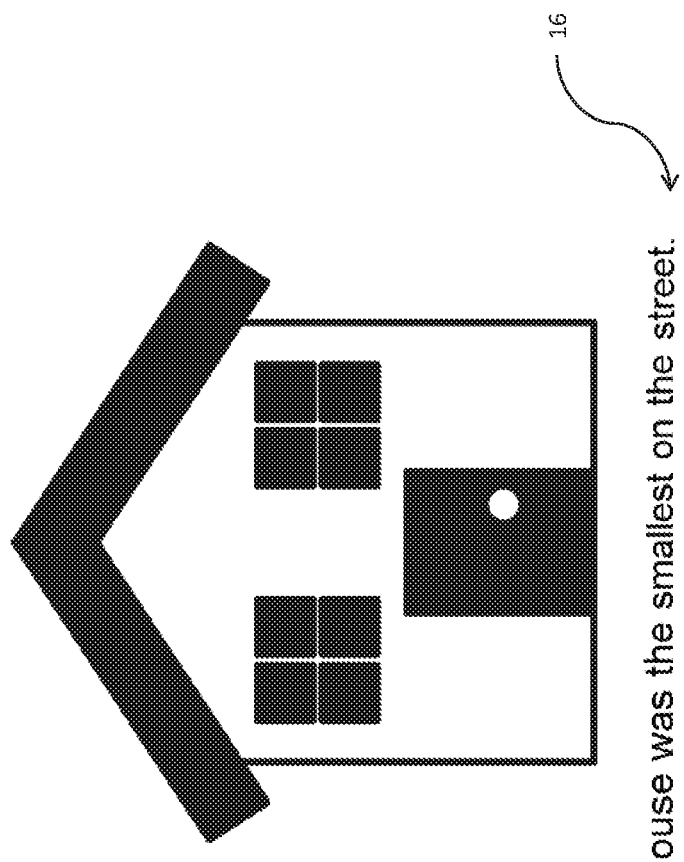
FIG. 4 shows a video screen including a background and a third segment according to the present disclosure.
Figure 5:
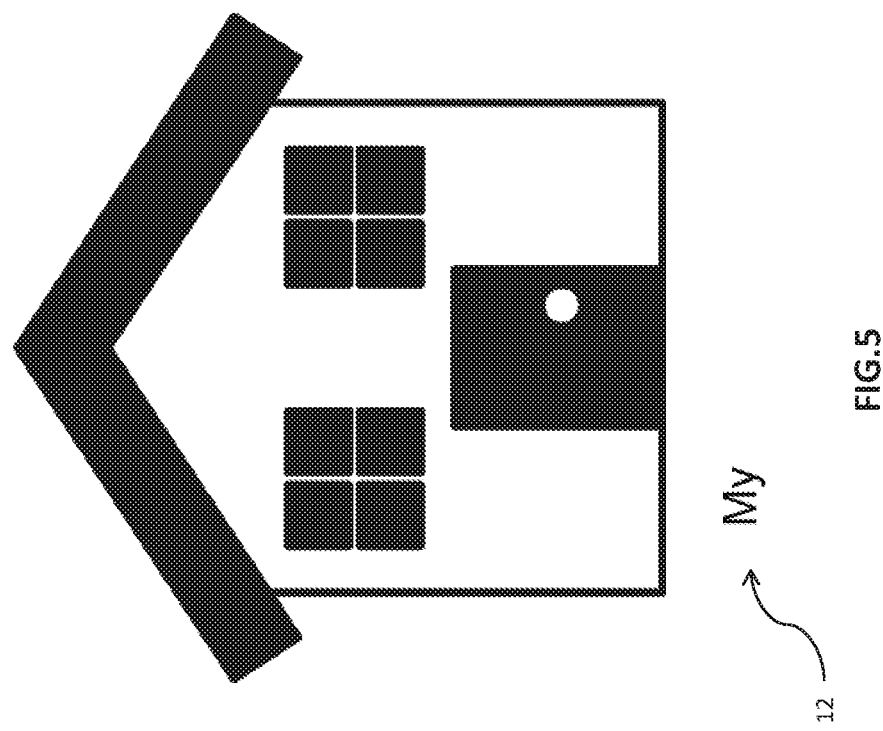
FIG. 5 shows a video screen including a background and first segment according to the present disclosure.
Figure 6:
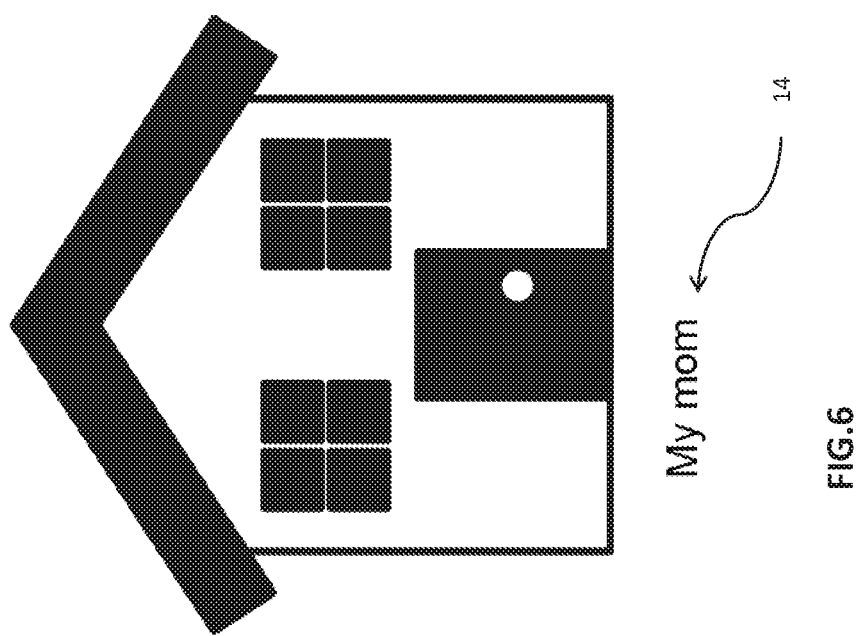
FIG. 6 shows a video screen including a background and second segment according to the present disclosure.
Figure 7:
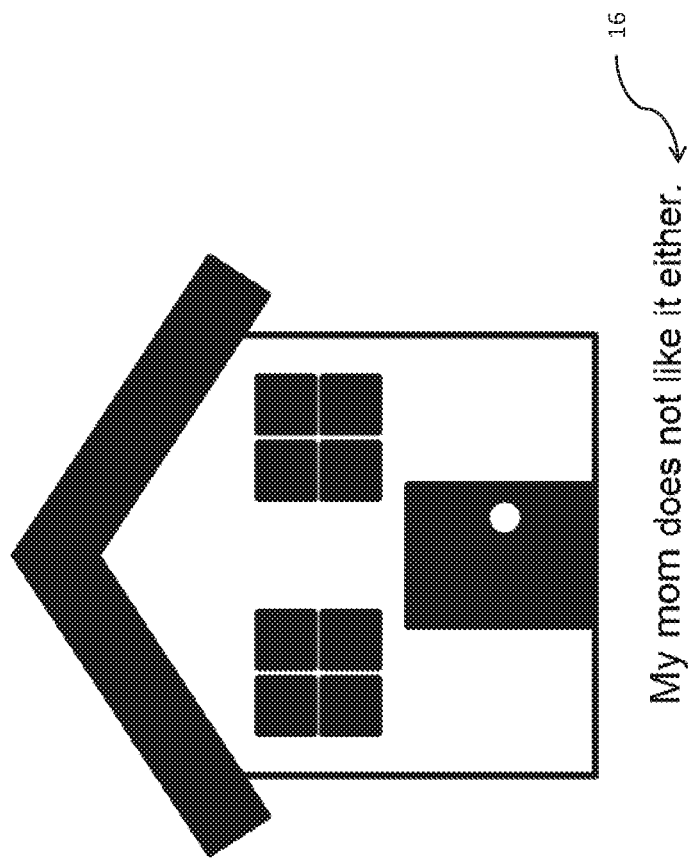
FIG. 7 shows a video screen including a background and third segment according to the present disclosure.

This process may be continued, creating as many segments 24 as needed to complete the page, as shown in FIGS. 4 and 7. If needed, a new page is started and the process is repeated until the reading material is completed, as shown in FIG. 6. It is noted here that the same background image 10 need not be used on a new page. Using a picture book as an example, each page has a unique background image.

The segments 24 may then be transferred to commonly available software via the flash drive. The video feed may be generated via a video editor, such as ADOBE CREATIVE CLOUD PREMIER PRO CC™. When the flash drive is accessed via the software, the contents may be displayed on the working screen 20. A mouse may then be placed over a desired segment 24 for a starting point and then dragged to a main working screen 22 on the right.

Segments 24 may be shortened or lengthened for time based on reading pace, by clicking each individual segment 24 in the working screen and lengthening or shortening them by scrolling them longer or shorter with the mouse. See examples of various lengths of segments 26 in FIG. 8.

Figure 8:
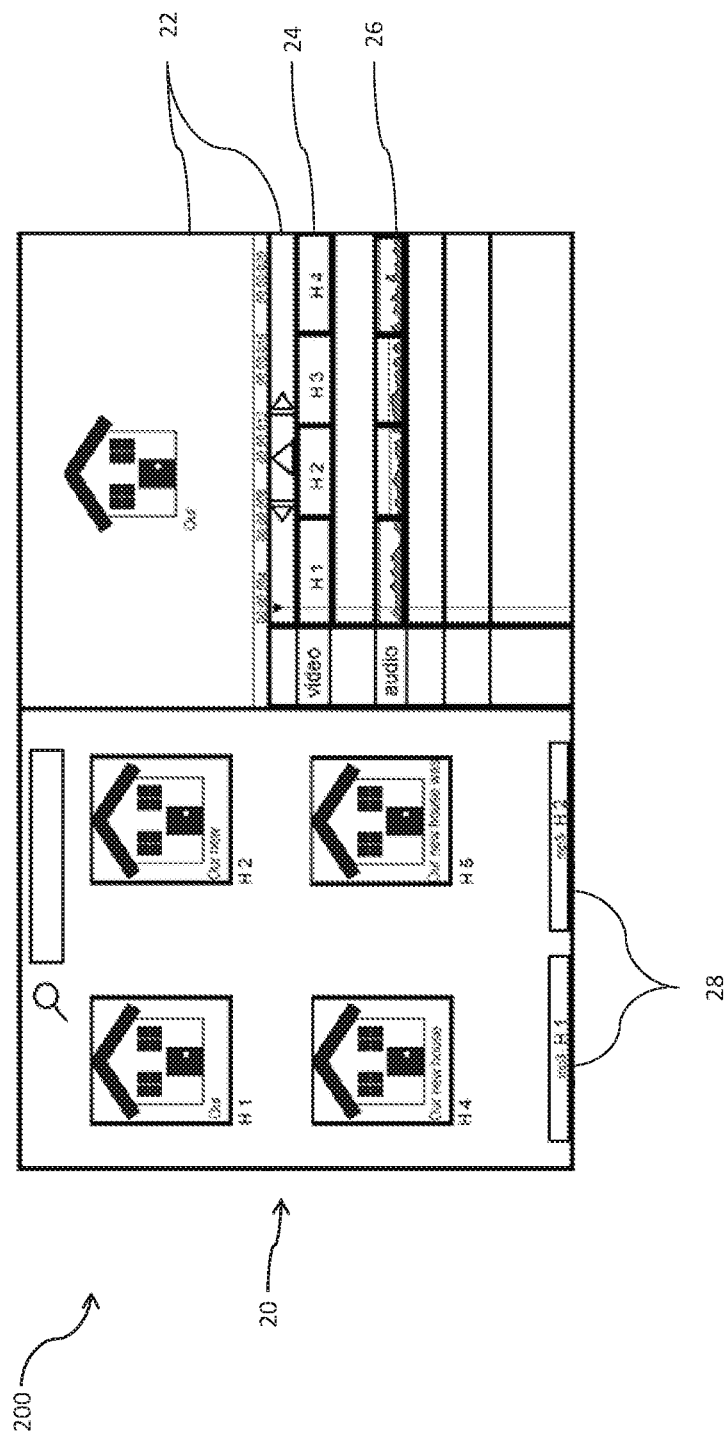
FIG. 8 shows key words for a story section.

With further regard to FIG. 8, audio accompaniment may be added by adding it to the working screen. Audio component 26 may be added at various segments 24 for accompaniment, described as H1 and H2. This is accomplished by transferring selected audio feed to commonly available software which may, in some embodiments, be accomplished by flash drives. The placing of audio feed is much the same as the visual segments 24, which includes placing the audio component 26 in the audio clip portion of the software, which in ADOBE CREATIVE COULD PREMIER PRO CC™ is placed below the visual feed on the main working screen 20 as shown in FIG. 8. The audio feed may be adjusted for time in the same way the visual segments 24 are adjusted; with the clicking and dragging of the mouse to shorten or lengthen the feed. This allows the audio segment(s) to be played simultaneously with the visual feed.

Once all segments 24 are added, and lengthened or shortened based on reading speed, and optional audio has been added, this reading material on video is then saved and exported to be viewed by the user. An online video player, such as YOUTUBE™, may be used to facilitate this.

In one embodiment, an operations-first embodiment, reading material on video is created to engage the reader seamlessly throughout the reading experience. Operating video reading material is as simplified by the process of the present disclosure. An operator, on a device of their choice, presses play and reads the text 32 as it is displayed upon the screen until said text 32 is completed. Text 32 may be paused or stopped, as is typically offered with video feed. An online video provider, such as YOUTUBE™, may be used to facilitate this.

With regard to FIG. 9, elements of language, including words and sentences, may be linked to elements of the language of music in order to help a student of the English language in terms of memory and comprehension using the audio component 26 of the video reader of the present disclosure. A story, for example a children's story, will include words, sentences, paragraphs and other elements of the English language. Keywords 21 in a sentence may be placed along side recognizable elements of music, herein referred to as associated music element 34, such that an element of music may help a student learn the word. For example, keywords 21 may be selected from a text section 210. The keywords 21 may be selected based on words that a drafter would like for a student to learn. In one embodiment, when a user reaches a certain portion of text, a keyword 21 may be associated with a recognizable element of music, which may include a chord, an instrument, a change in volume, a beat, a change in key, a designated melody, or other identifiable aspects of music. Determining when a user reaches a certain point in the text 32 can be accomplished in a variety of ways, including, but not limited to, having the keyword 21 appear on the screen at the same time associated music element 34 is played. At this point, keyword 21 may also change in color, or be highlighted by a color throughout.

In one embodiment, a short break in the text 32 could be planned by the drafter, and, based on a pre-determined speed of reading of the user, associated music element 34 could begin playing at the time the break ended.

Figure 10:
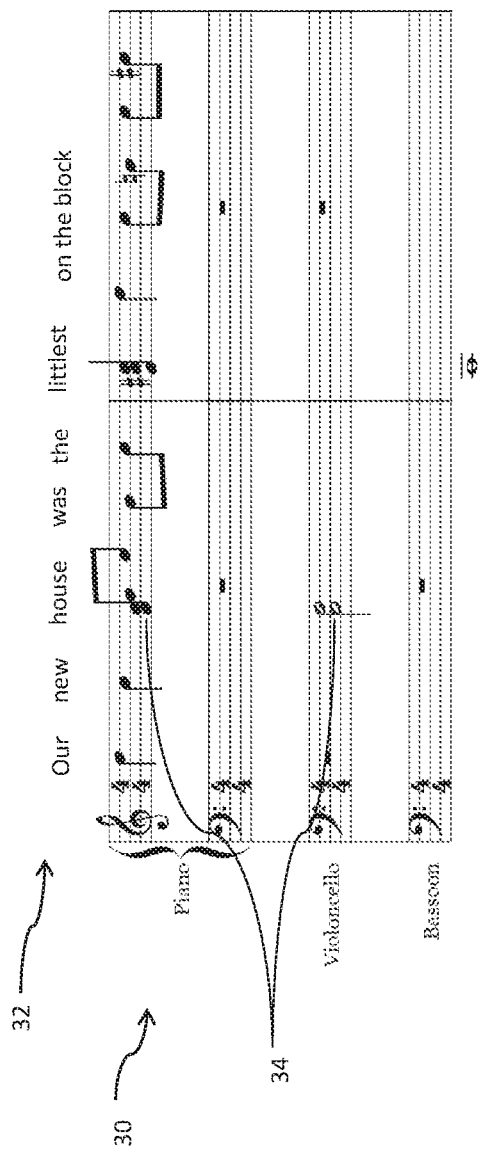
FIG. 10 shows a musical notation associated with text according to the present disclosure.

With regard to FIG. 10, musical notation 30 shows that associated music element 34 is shown as a chord comprising the notes F, A, and B in the treble clef and C and F in the bass clef. The keyword 21 from text 32 associated with the associated music element 34 is "house".

Figure 11:
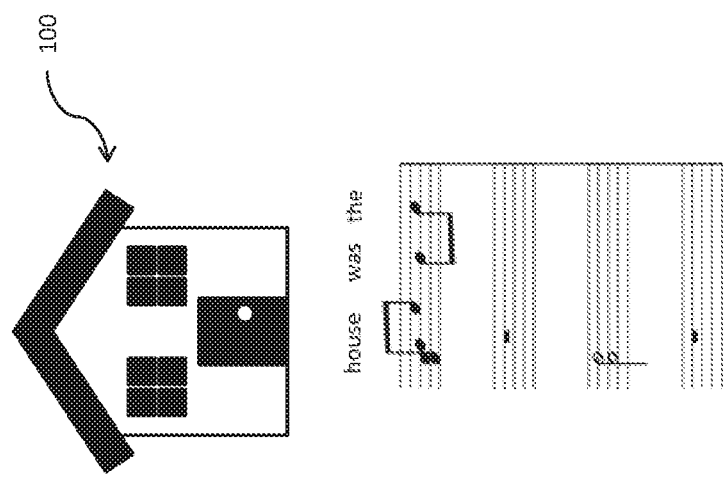
FIG. 11 shows a musical notation associated with text, including addition of a background element, according to the present disclosure.
Figure 11:
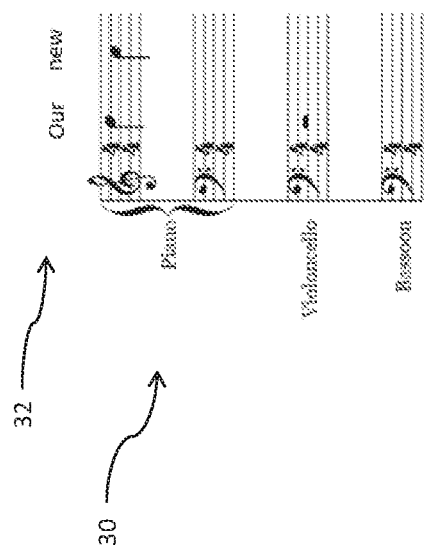

As shown in FIG. 11, in one embodiment, the background image 100 appears concurrently with the associated music element 34, a chord, wherein the background image 100 is a house. In one embodiment of the present disclosure, the notes of this chord would be played every time keyword 21

"house" appeared in text 32, and upon reaching keyword 21 in the video reader, a user would see background image 10, which may include a of a house associated with the keyword 21 in order to enhance reading skills.

Figure 12:
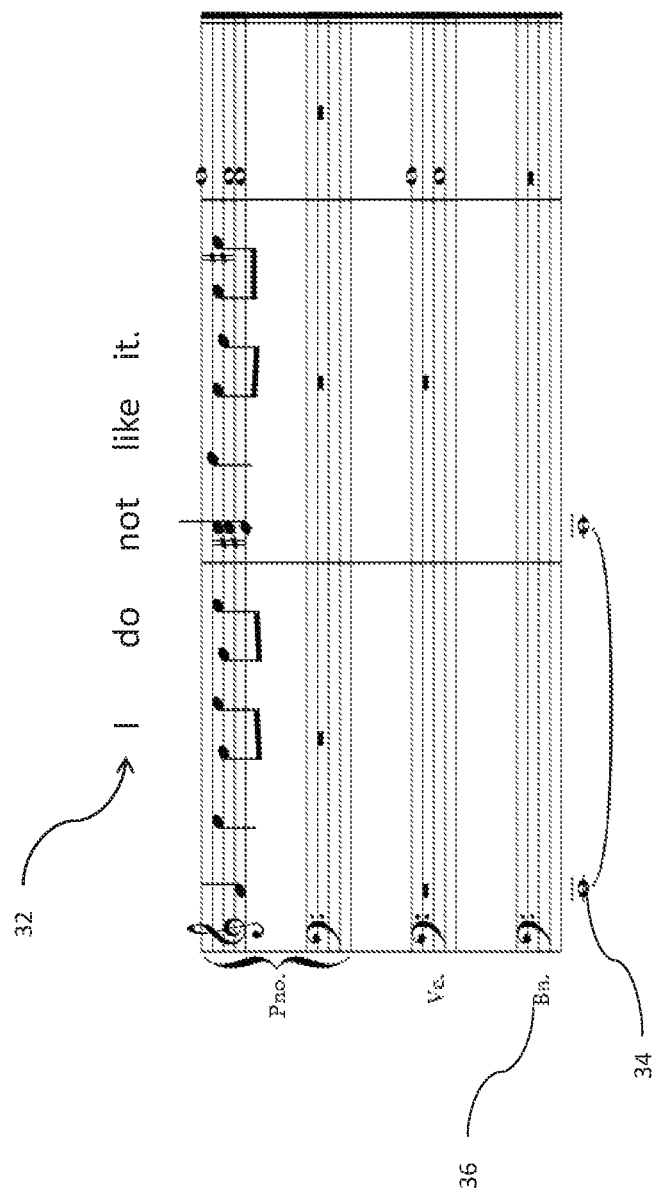
FIG. 12 shows a musical notation associated with text and addition of an instrument, according to the present disclosure.

As shown in FIG. 12, one embodiment includes an associated music element 34 being introduction of a new instrument 36, wherein the new instrument 36 may play for the duration of a sentence, or a defined amount of text 32. A background image 100 may appear in conjunction with the introduction of new instrument 36.

In another embodiment, a change of key from major to minor may occur in conjunction with a word, sentence or paragraph. A minor key may signal a darker mood for a sentence, such as "I do not like it.", as shown in FIG. 12, whereas a change in key from a minor key to a major key may signal a change from a negative word, sentence, phrase or paragraph to a positive word, sentence, phrase or paragraph.

Figure 13:
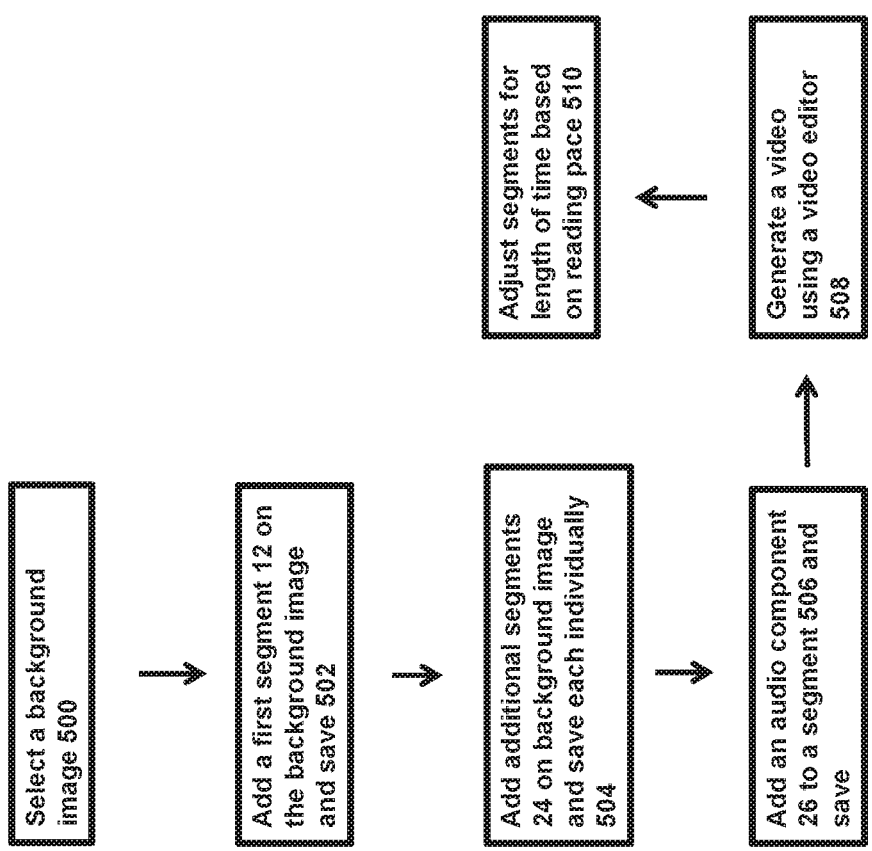
FIG. 13 shows a flow chart of one embodiment of the method of the present disclosure.

With regard to FIG. 13, a flow chart is shown for a method according to the present disclosure. The steps include: select a background image 500; add a first segment 12 on the background image and save 502; add a first segment 12 on the background image and save 502; add an audio component 26 to a segment 506 and save; generate a video using a video editor 508; adjust segments for length of time based on reading pace 510.

Figure 14:
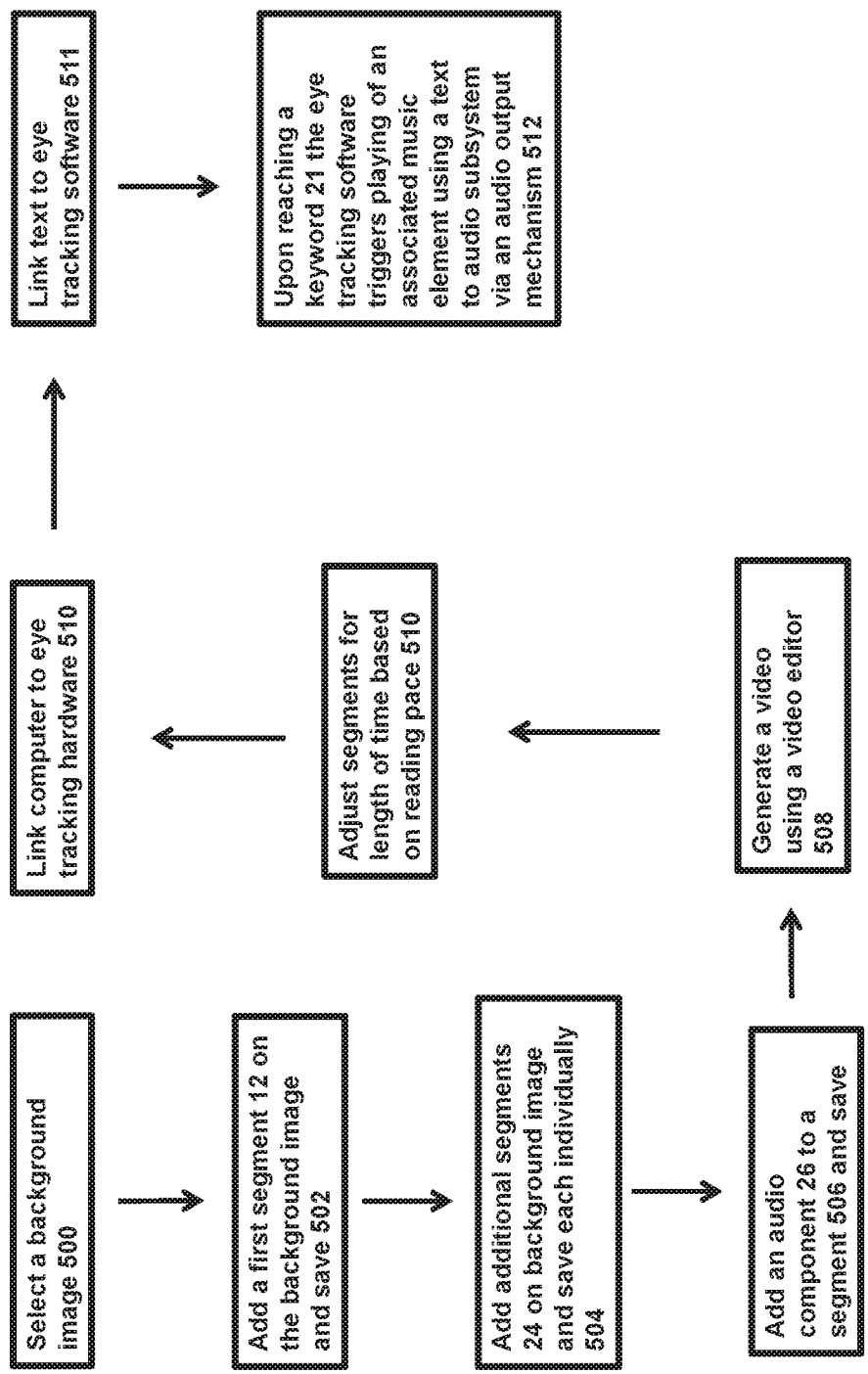
FIG. 14 shows a flow chart of one embodiment of the method of the present disclosure.

With regard to FIG. 14, in one embodiment, eye tracking software could be used to monitor the user's reading. Alternatively, music could be synchronized with the eye tracking software such that the associated music element 34 is played when a user reaches the keyword 21. Eye tracking data may be collected using either a remote or head-mounted 'eye tracker' connected to a computer. Eye tracking devices generally include two common components: a light source and a camera. The light source, which may be infrared, is directed toward the eye. A camera tracks the reflection of the light source along with visible ocular features such as the pupil. Data from the camera can be used to determine the rotation of the eye and direction of the gaze. Blink frequency, pupil dilation and other eye associated physical functions may be detected by the tracking device.

Data from the eye tracker is then analyzed by compatible software. In some embodiments, eye tracking glasses may be used. Eye tracking software, in the present disclosure, allows for the linking of associated music elements 34 and text 32, such that associated music elements 34 can be associated with keywords 21 to assist learning. In one embodiment, text-to-speech software can be reprogrammed to play preprogrammed associated music elements 34 instead of a word. In this embodiment, associated music element 34 may include but is not limited to a change from single notes to a chord, a change in key, a change in time signature, a change in instrumentation, or a change in volume may occur when a reader's eye reaches a point at which the designer would like to the user to learn a word or structural aspect of the language. In one embodiment, associated music element 34 may be a chord may be surrounded by single notes.

In this embodiment, the speed and position at which content is converted to audio in an audio reader can be adjusted. The method includes determining a position of a user's eye gaze, identifying a content displayed at the position of the user's eye gaze, determining an audio corresponding to the content, and outputting the audio. This embodiment allows the user's reading to drive the text to music conversion, resulting in the computer playing associated music element 34 based on what the user is currently reading. The user may then read text 32 at a variable rate and at different positions, with the text 32 to music conversion following the user. It also comprises a text to audio subsystem 206 which contains text to audio software to play music associated elements 34 upon reaching a keyword 21. The eye-tracking hardware 510 and the text to audio subsystem 512 are both coupled to an interface and conversion subsystem. The interface and conversion subsystem contain software 511 which obtains the user's current eye position via the eye-tracking hardware, determines the corresponding text displayed at that position by the reader, and converts this text to audio via the text to audio feature. The audio is then outputted via the audio output mechanism 512, such as computer audio speakers.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

All documents cited in the Detailed Description of the invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

What is claimed is:

1. A method of delivering a story on video, comprising:
providing a story on a continuous video feed wherein words are displayed sequentially and continuously to tell a story without interruption until the story is complete;
linking at least one element of music to at least one of a designated word, a designated sentence or a designated paragraph in the story;
linking an appearance of a background image to the at least one of the designated word, the designated sentence or the designated paragraph;
wherein said at least one element of music is adapted to aid in remembering the at least one of the designated word, the designated sentence or the designated paragraph and wherein the at least one element of music is a change in key from major to minor for a duration of a paragraph to accompany a change in mood of the story.

2. The method of delivering a story on video of claim 1, wherein the at least one element of music comprises a chord, wherein only one chord per measure is played, wherein the chord is synchronized to be played with a designated word as the designated word is read by a user on a video screen.

3. The method of delivering a story on video of claim 1, wherein an image of the designated word appears simultaneously the at least one element of music.

4. The method of delivering a story on video of claim 1, wherein the at least one element of music is a change of instrument occurring simultaneously with the appearance of the designated word.

5. The method of delivering a story on video of claim 1, wherein the at least one element of music is a change of key occurring simultaneously with the appearance of the designated word.

6. The method of delivering a story on video of claim 1, wherein a designated combination of a plurality of instruments and a plurality of notes are played upon appearance of a designated word.

7. The method of delivering a story on video of claim 1, wherein a same melody is played upon appearance of a same word throughout the story.

8. A method of delivering a story on video, comprising:
providing a story on a continuous video feed wherein words are played sequentially and continuously to tell a story without interruption until the story is complete;
linking at least one element of music to at least one of a designated word, a designated sentence or a designated paragraph in the story;
wherein said at least one element of music is adapted to aid in remembering the at least one of the designated word, designated sentence or designated paragraph;
linking a computer to eye tracking hardware;
linking a text of a story to eye tracking software;
upon a user reading the at least one of the designated word, the designated sentence or designated paragraph, the eye tracking software triggers playing of an associated music element using a text to audio subsystem via an audio output mechanism and wherein the at least one element of music is a change in key from major to minor for a duration of a paragraph to accompany a change in mood of the story.

9. The method of delivering a story on video of claim 8, further comprising linking an appearance of a background image to a user reading at least one of the designated word, the designated sentence or the designated paragraph.

10. The method of delivering a story on video of claim 8, wherein the at least one element of music comprises a chord, wherein only one chord per measure is played, wherein the chord is synchronized to be played with a designated word as the designated word is read by a user on a video screen.

11. The method of delivering a story on video of claim 8, wherein an image of the designated word appears simultaneously the at least one element of music.

12. The method of delivering a story on video of claim 8, wherein the at least one element of music is a change of instrument occurring simultaneously with an appearance of the designated word.

13. The method of delivering a story on video of claim 8, wherein the at least one element of music is a change of key occurring simultaneously with a user reading the designated word.

14. The method of delivering a story on video of claim 8, wherein a designated combination of a plurality of instruments and a plurality of notes are played upon the user reading the designated word.

15. The method of delivering a story on video of claim 8, wherein a same melody is played upon the user reading a designated word throughout the story.

16. The method of delivering a story on video of claim 8, further comprising linking appearance of a background image to the at least one of the designated word, the designated sentence or the designated paragraph along with a change in color of the designated word, designated sentence or the designated paragraph.

17. A method of delivering a story on video, comprising:
providing a story on a continuous video feed wherein words are displayed sequentially and continuously to tell a story without interruption until the story is complete;
linking at least one element of music to at least one of a designated word, a designated sentence or a designated paragraph in the story;
linking an appearance of a background image to the at least one of the designated word, the designated sentence or the designated paragraph;
wherein said at least one element of music is adapted to aid in remembering the at least one of the designated word, the designated sentence or the designated paragraph and wherein the at least one element of music is a change in key from major to minor for a duration of a paragraph in conjunction with a change in color of the background image from lighter to darker.

* * * * *